(12) United States Patent
Jammoussi et al.

(10) Patent No.: US 10,629,008 B2
(45) Date of Patent: Apr. 21, 2020

(54) VEHICLE DIAGNOSTIC OPERATION

(71) Applicant: Ford Global Technologies, LLC, Dearborn, MI (US)

(72) Inventors: Hassene Jammoussi, Canton, MI (US); Pankaj Kumar, Dearborn, MI (US); Imad Hassan Makki, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 262 days.

(21) Appl. No.: 15/817,742

(22) Filed: Nov. 20, 2017

(65) Prior Publication Data

US 2019/0156599 A1    May 23, 2019

(51) Int. Cl.
| | |
|---|---|
| *G07C 5/08* | (2006.01) |
| *B60W 40/06* | (2012.01) |
| *B60W 30/188* | (2012.01) |
| *G01C 21/34* | (2006.01) |
| *B60W 40/08* | (2012.01) |

(52) U.S. Cl.
CPC .......... *G07C 5/0808* (2013.01); *B60W 30/188* (2013.01); *B60W 40/06* (2013.01); *G01C 21/3453* (2013.01); *B60W 40/08* (2013.01); *B60W 2040/0881* (2013.01); *B60W 2550/141* (2013.01); *B60W 2550/20* (2013.01); *B60W 2720/106* (2013.01); *B60W 2720/12* (2013.01)

(58) Field of Classification Search
None
See application file for complete search history.

(56) References Cited

U.S. PATENT DOCUMENTS

| | | | |
|---|---|---|---|
| 5,150,609 A * | 9/1992 | Ebner | B60T 8/885 |
| | | | 73/114.61 |
| 7,751,955 B2 | 7/2010 | Chinnadurai et al. | |
| 9,315,178 B1 | 4/2016 | Ferguson et al. | |
| 9,524,265 B2 * | 12/2016 | Harriman | G06F 1/12 |
| 9,594,379 B1 | 3/2017 | Ferguson et al. | |
| 9,639,995 B2 | 5/2017 | Cacabelos et al. | |
| 9,792,656 B1 * | 10/2017 | Konrardy | H04W 4/90 |
| 2010/0211249 A1 | 8/2010 | McClellan | |
| 2015/0100191 A1 | 4/2015 | Yopp | |

* cited by examiner

*Primary Examiner* — Richard M Camby
(74) *Attorney, Agent, or Firm* — Frank A. MacKenzie; Bejin Bieneman PLC

(57) ABSTRACT

A system includes a processor and a memory. The memory stores instructions executable by the processor to, based on a vehicle destination, identify a diagnostic condition and a specified operating pattern of a vehicle component that includes at least one of vehicle propulsion, braking, and steering. The memory stores instructions executable by the processor to operate the vehicle based on the vehicle component and the operating pattern.

13 Claims, 4 Drawing Sheets

VEHICLE DIAGNOSTIC OPERATION

BACKGROUND

A vehicle component such as an actuator, sensor, controller, etc., may fail to operate, which may impair a vehicle operation. Vehicle computers may perform diagnostic operation to detect a fault or failure of a vehicle component. However, it is a problem that vehicle diagnostic tests can be affected by environmental and/or vehicle conditions.

DETAILED DESCRIPTION

Introduction

Figure 1:
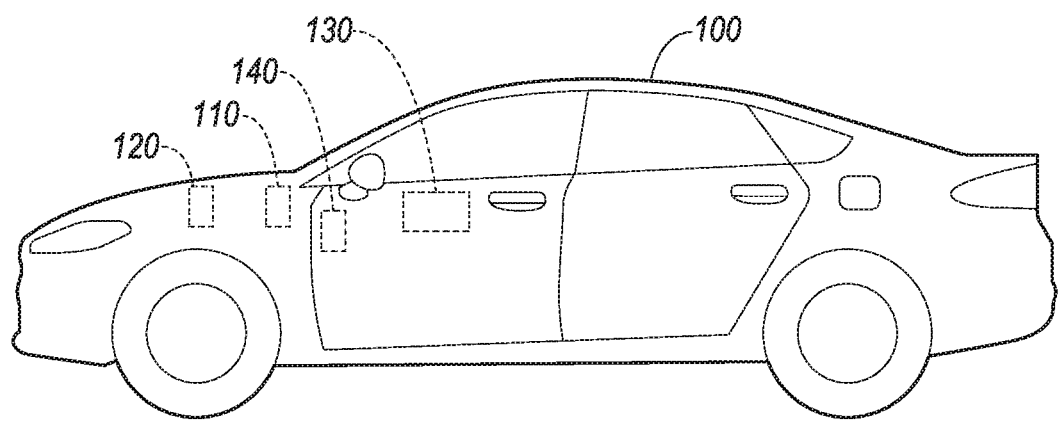
FIG. 1 is a diagram of an exemplary vehicle system.

Disclosed herein is a system that includes a processor and a memory. The memory stores instructions executable by the processor to, based on a vehicle destination, identify a diagnostic condition and a specified operating pattern of a vehicle component that includes at least one of vehicle propulsion, braking, and steering, and to operate the vehicle based on the vehicle component and the operating pattern.

The operating pattern may include a maximum acceleration and a minimum acceleration.

The instructions may further include instructions to operate the vehicle at an acceleration greater than the minimum acceleration and less than the maximum acceleration.

The operating pattern may include a maximum yaw rate and a minimum yaw rate.

The operating pattern may include a maximum speed and a minimum speed associated with a road type.

The instructions may further include instructions to determine a vehicle route based on the destination and the vehicle diagnostic condition.

The instructions may further include instructions to select the vehicle diagnostic condition from a plurality of possible vehicle diagnostic conditions based on an assigned priority of each of the possible diagnostic conditions.

The instructions may further include instructions to identify the vehicle diagnostic condition from a plurality of possible vehicle diagnostic conditions based on at least one of terrain data, vehicle occupancy data, and traffic data, in addition to the vehicle destination.

The vehicle diagnostic condition may include one or more of a substantially constant vehicle engine speed for a predetermined time, a deceleration caused by a fuel shut off, exceeding a predetermined vehicle speed, and applying a predetermined brake pressure.

The instructions may include further instructions to perform a diagnostic operation upon meeting the diagnostic condition, wherein the diagnostic operation includes verifying whether a fault condition was met.

The instructions may include further instructions to adjust the specified operating pattern upon determining that the vehicle is operating without a vehicle occupant.

Further disclosed herein is a method including, based on a vehicle destination, identifying a diagnostic condition and a specified operating pattern of a vehicle component that includes at least one of vehicle propulsion, braking, and steering, and operating the vehicle based on the vehicle component and the operating pattern.

The operating pattern may include a maximum acceleration and a minimum acceleration.

The method may further include operating the vehicle at an acceleration greater than the minimum acceleration and less than the maximum acceleration.

The method may further include determining a vehicle route based on the destination and the vehicle diagnostic condition.

The method may further include selecting the vehicle diagnostic condition from a plurality of possible vehicle diagnostic conditions based on an assigned priority of each of the possible diagnostic conditions.

The method may further include identifying the vehicle diagnostic condition from a plurality of possible vehicle diagnostic conditions based on at least one of terrain data, vehicle occupancy data, and traffic data, in addition to the vehicle destination, wherein the vehicle diagnostic condition includes one or more of a substantially constant vehicle engine speed for a predetermined time, a deceleration caused by a fuel shut off, exceeding a predetermined vehicle speed, and applying a predetermined brake pressure.

Further disclosed herein is a system including a vehicle component that is one of vehicle propulsion, braking, and steering, means for identifying, based on a vehicle destination, a diagnostic condition and a specified operating pattern of the vehicle component, and means for operating the vehicle based on the identified diagnostic condition and the identified operating pattern.

The identified diagnostic condition may be based on at least one of terrain data, vehicle occupancy data, and traffic data, in addition to the vehicle destination.

The system may further include means for operating the vehicle at an acceleration greater than a minimum acceleration and less than a maximum acceleration, wherein the operating pattern includes a maximum acceleration and a minimum acceleration.

Further disclosed is a computing device programmed to execute the any of the above method steps. Yet further disclosed is a vehicle comprising the computing device.

Yet further disclosed is a computer program product, comprising a computer readable medium storing instructions executable by a computer processor, to execute any of the above method steps.

System Elements

FIG. 1 is a block diagram of a vehicle 100. The vehicle 100 may be powered in a variety of known ways, e.g., with an electric motor and/or internal combustion engine. The vehicle 100 may include a computer 110, actuator(s) 120, sensor(s) 130, and a human machine interface (HMI 140), each of which are discussed in more detail below.

The computer 110 includes a processor and a memory such as are known. The memory includes one or more forms of computer-readable media, and stores instructions executable by the computer 110 for performing various operations, including as disclosed herein.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may operate a vehicle 100 in an autonomous, a semi-autonomous mode, or a non-autonomous (or manual) mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking; in a non-autonomous mode a human operator controls each of vehicle 100 propulsion, braking, and steering.

The computer 110 is generally arranged for communications on a vehicle communication network, e.g., including a communication bus such as a controller area network (CAN) or the like. The computer 110 may include or be communicatively coupled to, e.g., via a vehicle communications bus as described further below, more than one processor, e.g., controllers or the like included in the vehicle for monitoring and/or controlling various subsystems such as a powertrain, brake, steering, etc.

Via the vehicle network, the computer 110 may transmit messages to various devices in the vehicle 100 and/or receive messages from the various devices, e.g., controllers, actuators, sensors, etc., including sensors 130. Alternatively or additionally, in cases where the computer 110 actually comprises multiple devices, the vehicle communication network may be used for communications between devices represented as the computer 110 in this disclosure. Further, as mentioned below, various controllers and/or sensors 130 may provide data to the computer 110 via the vehicle communication network.

In addition, the computer 110 may be configured for communicating through a wireless communication interface with a remote computer via a wireless communication network. The communication network may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary V-to-V communication networks include cellular, Bluetooth, IEEE 802.11, dedicated short range communications (DSRC), and/or wide area networks (WAN), including the Internet, providing data communication services.

Sensors 130 may include a variety of devices known to provide data via the vehicle communications bus. For example, the sensors 130 may include one or more cameras, radars, and/or Light Detection and Ranging (LIDAR) sensors disposed in the vehicle 100 providing data encompassing at least some of the vehicle interior and/or exterior.

The actuators 120 typically include circuits, chips, or other electronic components that can actuate various vehicle subsystems in accordance with appropriate control signals as is known. For instance, the actuators 120 may include one or more relays, servomotors, etc. The actuators 120, therefore, may be used to control braking, acceleration, and steering of the vehicle 100. The control signals used to control the actuators 120 may be generated by the computer 110, a control unit located in the vehicle 100, e.g., the brake controller, etc. The vehicle 100 may include various components or sub-systems, each include one or more sensors 130, actuators 120, controller, etc. For example, the vehicle 100 may include a brake component including brake sensors 130, brake actuators 120, and/or other electronic, mechanical, etc. elements that stop the vehicle 100 based on commands received from a controller such as the computer 110. As another example, the vehicle 100 may include a powertrain component or sub-system that may include one or more actuators 120, sensors 130, etc., in addition to an engine, electric motor, and/or a transmission.

The HMI 140 may be configured to receive user input, e.g., during operation of the vehicle 100. As one example, an HMI 140 may include touchscreens, buttons, knobs, keypads, microphone, and so on for receiving information from a user. Moreover, an HMI 140 may include various interfaces such as a touchscreen display, a smart phone, etc., for receiving information from a user and/or output information to the user.

A vehicle 100 component, e.g., an actuator 120, a sensor 130, an electronic controller included in a component, etc., may have a fault. A fault is a condition in which a component fails to operate or operates outside of one or more predefined parameters (e.g., a predefined parameter could be a physical quantity such as temperature, torque, revolutions per minute, pressure, etc.). The vehicle 100 computer 110 may be programmed to determine whether a vehicle 100 component, e.g., a propulsion, braking, steering, etc., is in a fault condition based on data received from, e.g., various vehicle 100 sensors 130, actuators 120, controllers, etc. For example, a fault can be determined by a diagnostic operation, i.e., the computer 110 may be programmed to monitor a vehicle 100 component and determine whether a fault condition has occurred, e.g., whether a physical quantity is outside a predefined range.

The computer 110 may be programmed to perform a diagnostic operation upon receiving and analyzing data to determine whether a diagnostic condition is met. A "diagnostic condition," in the context of present disclosure, means a condition to be met before a diagnostic operation can be performed. Upon determining that the diagnostic condition is met, then computer 110 may be programmed to verify whether a fault condition is met. For example, a minimum output torque may be expected from an engine after the engine reaches a threshold temperature. Thus, in this example, the diagnostic condition may be "engine temperature exceeds the predefined temperature threshold," and the fault condition may be "the engine torque output is less than the expected torque threshold." The computer 110 may be programmed to perform the diagnostic operation, i.e., to determine whether the fault condition is met only upon determining that the diagnostic condition was met. The diagnostic operation may further include updating a diagnostic status upon determining that a fault condition is met and/or a previously met fault condition is resolved, i.e., the fault condition does not exist anymore, e.g., a deficient vehicle 100 part was replaced.

The diagnostic operation may further include recording the diagnostic status, e.g., in a computer 110 memory. Each diagnostic operation may be identified by a diagnostic trouble code (DTC) which is typically a unique numeric code specifying a particular fault condition that the computer 110 may receive via a vehicle 100 network such as a Controller Area Network (CAN communications bus. It is to be understood that DTCs are discussed herein by way of example and not limitation; other fault identifiers or descriptors could be used in the context of the present disclosure. In one example, a DTC may be associated with a diagnostic condition, a diagnostic fault condition, status, etc. A vehicle 100 computer 110 may be programmed to perform various diagnostic operations associated with various vehicle 100 components. A status of a DTC typically includes an "active" and an "inactive" state. "Active" means the DTC is recorded, whereas "inactive" means the DTC is not recorded (e.g., no deficiency was determined or a recorded deficiency was erased from the computer 110 memory). The computer 110 may be programmed to update and store a diagnostic status associated with each of the diagnostic operations in a computer 110 memory and/or transmit the diagnostic status via the vehicle 100 communication network to another computer, e.g., a diagnostic tester.

Each DTC typically identifies a fault condition of a specific vehicle 100 component, e.g., associated with vehicle 100 propulsion, steering, braking, etc. Further, each DTC may be associated with a diagnostic condition (or conditions), i.e., a condition, such as a measured physical value (e.g., a temperature) meeting or exceeding a threshold, to be met before a diagnostic operation can be performed. For example, in order to perform a specific diagnostic operation for a vehicle 100 steering, the computer 110 may be programmed to determine whether a diagnostic condition of "driving on a straight line for at least 10 seconds" is met. Thus, a specific component (i.e., the steering) of the vehicle 100 is associated with meeting the diagnostic condition (i.e., driving on a straight line) of this diagnostic operation (detecting a fault condition of the steering component such as a proper alignment thereof.

Figure 2:
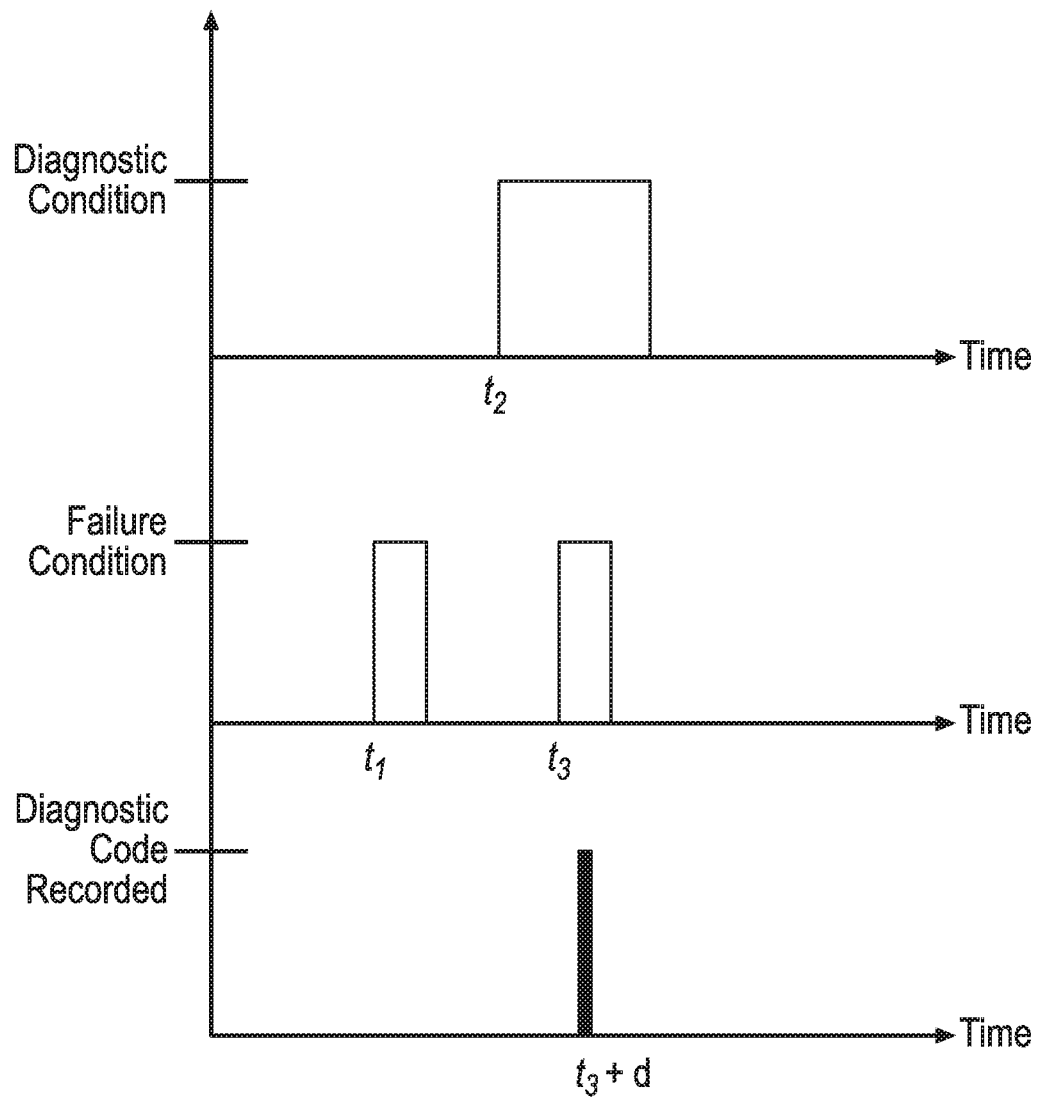
FIG. 2 shows example graphs of a diagnostic condition, failure condition, and recording of a diagnostic trouble code.

FIG. 2 illustrates example graphs of a diagnostic condition, a fault condition, and recording a DTC, thereby presenting a simple example of these data in a diagnostic operation. For example, a fault condition may exist for a period beginning at a time $t_1$ but not result in recording a DTC (i.e., setting the status of the DTC to "active"), because a prerequisite diagnostic condition was not met at time $t_1$ to activate a diagnostic operation to detect the fault condition. At a time $t_2$, the diagnostic condition is met, and therefore a diagnostic operation can be performed to detect a fault condition that begins at a time $t_3$ resulting in recording a DTC.

In one example, the computer 110 may be programmed to record the DTC upon determining that a time d, e.g., 5 seconds, has elapsed since both the fault condition and the diagnostic condition were met. The time delay d may advantageously prevent recording the DTC if a transitory effect such as a noise in a signal has caused an unwanted temporary activation of the fault condition.

As discussed above, the computer 110 may be programmed to perform various diagnostic operations (e.g., resulting in setting a status of one or more DTCs), each associated with, i.e., diagnosing a fault or no-fault status of, one or more of vehicle 100 components and/or operations. A diagnostic condition may be specified based on a specific vehicle 100 component. For example, to diagnose a specific deficiency in a vehicle 100 steering component, the diagnostic condition may be "vehicle 100 moves for at least a predetermined time (e.g., 10 seconds) on a straight line." As another example, to diagnose a vehicle 100 brake component, the diagnostic condition may be "a minimum amount of brake pressure is applied on vehicle 100 brake pads." Thus, a given diagnostic condition may or may not be met during operation of the vehicle 100. For example, when the vehicle 100 navigates on a curved road, the example steering diagnostic condition described above may not be met.

The computer 110 can be programmed to determine that a diagnostic condition and a specified operating pattern (as defined below) are met for a vehicle 100 component based on a vehicle 100 destination. As stated above, the vehicle 100 component may include a vehicle 100 propulsion, braking, and/or steering. The computer 110 can then operate the vehicle 100, e.g., in an autonomous or semi-autonomous mode, based on the identified vehicle 100 component and an operating pattern.

In the present disclosure, an "operating pattern" is a set of a plurality of data that specifies vehicle 100 physical parameters including speed, acceleration, yaw rate, elevation, slope of a vehicle body, vibration, etc., and/or instructions sent by the vehicle 100 computer 110 to vehicle 100 components including planning a route to achieve specific speed, acceleration, etc. The computer 110 may be programmed to navigate the vehicle 100 to traverse the planned route by actuating the vehicle 100 actuators 120.

Table 1 shows an example list of diagnostic operations for the example vehicle 100 system. Each diagnostic operation may include an identifier (e.g., a DTC code), priority, diagnostic condition, fault condition, and diagnostic status. Each diagnostic operation may be associated with one or more operating pattern(s), as discussed below. Thus, each row of Table 1 shows a diagnostic condition to be met before a diagnostic operation can be performed to determine the diagnostic status of the diagnostic operation shown in the respective row. For example, the diagnostic condition of $DTC_1$ (for convenience, each diagnostic operation shown in Table 1 is referred to in the text with a subscript indicating its identifier DTC code from Table 1) indicates the vehicle 100 steering component, whereas the diagnostic condition for $DTC_6$ indicates that a diagnostic operation can be performed for each of the vehicle 100 steering, propulsion, and braking components.

A diagnostic operation priority provides a rating or ranking of importance to perform a diagnostic operation. In one example, the priority may be a predetermined level such as "low", "medium", and "high." Additionally or alternatively, the computer 110 may be programmed to determine the priority based on, e.g., a distance travelled since last performing of the diagnostic operation. For example, the computer 110 may be programmed to increase a priority of a DTC when the distance travelled since last performing of the respective DTC exceeds a distance threshold, e.g., 50 kilometers (km).

Table 1 shows various example diagnostic conditions: i) driving on a straight line ($DTC_1$), which may be determined based on a vehicle 100 yaw rate kept less than a predetermined threshold; ii) a vehicle 100 speed exceeding a predetermined vehicle speed threshold ($DTC_2$); iii) applying at least a predetermined brake pressure ($DTC_3$); iv) a vehicle 100 deceleration caused by a fuel injection shut off which is sometimes also referred to as an engine brake ($DTC_4$); v) a substantially constant vehicle 100 speed for a predetermined time ($DTC_5$); and vi) activate at least a predetermined amount of electric loads in the vehicle 100 ($DTC_6$).

Table 1 further shows various example operating patterns, each associated with a DTC diagnostic condition. In other words, when the vehicle 100 is operated based on a vehicle 100 operating pattern, then a respective diagnostic condition may be met. Thus, the computer 110 may be programmed to actuate vehicle 100 actuators 120 based on the operating pattern, and, upon determining that the diagnostic condition is met, to perform the diagnostic operation associated with the diagnostic condition.

For example, the operating pattern may include: i) a maximum acceleration and/or a minimum acceleration, ii) a maximum yaw rate and/or a minimum yaw rate; iii) a maximum speed and/or a minimum speed associated with a road type (i.e., the operating pattern includes road data associated with the vehicle 100 route). For example, with reference to $DTC_7$, the computer 110 may be programmed to operate the vehicle 100 at an acceleration greater than a minimum acceleration, e.g., 0.3 meter/second (m/s$^2$), and less than the maximum acceleration, e.g., 1 m/s$^2$.

TABLE 1

| DTC Identifier | Priority | Diagnostic Condition | Operating Pattern | Vehicle Component |
|---|---|---|---|---|
| 1 | High | Driving on a straight line | Road curvature diameter greater than 5000 meters Set steering angle to zero degree | Steering |
| 2 | Medium | Speed exceeds 80 km/h for at least 5 minutes | Route includes a highway or freeway Cruise control speed greater than 80 km/h | Propulsion |
| 3 | High | Brake pressure exceeds pre-determined threshold at least 5 times within 5 minutes | Route includes a stop and go traffic condition, e.g., an urban area with multiple traffic intersections | Braking |
| 4 | Low | Engine brake deceleration exceeding a predetermined deceleration threshold | Route includes a mountainous terrain Decelerate by abrupt stop of injection in down-hills section(s) of the route | Propulsion |
| 5 | Medium | Constant engine speed for at least 5 minutes | Route includes a flat road section Activate cruise control to a constant set speed | Propulsion |
| 6 | High | Activate at least 80% of vehicle electric loads | Turn on headlight, seat heating, AC, media player, etc. | Propulsion, Steering, Braking |
| 7 | Low | Vehicle acceleration above a maximum acceleration threshold and below a minimum acceleration threshold | Navigate the vehicle while maintaining vehicle acceleration between the minimum and maximum acceleration thresholds | Propulsion |

The computer 110 may be programmed to determine a vehicle 100 route based on a vehicle 100 destination and a vehicle 100 diagnostic condition. The vehicle 100 destination may be determined based on input received via, e.g., the HMI 140, remote computer, etc. For example, based on the $DTC_1$ diagnostic condition, the computer 110 may be programmed to determine a route that includes at least a straight road section, e.g., based on map data received from a remote computer, e.g., via a wireless communication network. The map data may include a road curvature diameter for a segment of a road, and the computer 110 may be programmed to determine whether the road segment is straight based on the received road curvature radius, e.g., when the radius exceeds a predetermined threshold such as 10 kilometers. The computer 110 may be programmed to determine whether a route to the destination can be identified which has at least one straight road section of at least a predetermined distance (as specified in a diagnostic condition) based on the map data. The computer 110 may be programmed to determine possible routes from a vehicle 100 current location to the destination using conventional route planning techniques and then select a route that includes a straight road segment that satisfies a diagnostic condition, if such route is found.

The computer 110 may be programed to select a diagnostic condition from a set of possible diagnostic conditions, e.g., as shown in Table 1, based on an assigned priority of each of the possible diagnostic conditions. Thus, the computer 110 may be programmed to select one or more of the diagnostic conditions based on the respective priorities. For example, the computer 110 typically is programmed to select diagnostic conditions with a "high" priority, and then for lower priorities. Thus, even if all diagnostic conditions cannot be met while a route is being traversed, those with higher priorities will be met first.

The computer 110 may be programmed to identify a currently-met diagnostic condition from multiple possible vehicle diagnostic conditions based on at least one of terrain data, vehicle 100 occupancy data, and traffic data, in addition to a vehicle 100 destination. In one example, the computer 110 may be programmed to select one or more diagnostic condition(s) that are, or are predicted to be, met (i.e., a prerequisite operating pattern exists or is predicted to exist) based on the destination, map data, and/or the current location of the vehicle 100. In an example that can be discussed with respect to Table 1, upon determining that the vehicle 100 current location and the destination are in a congested urban area with no freeway on a route to the destination, e.g., based on the received map data, then the computer 110 may be programmed to select the diagnostic conditions of $DTC_3$, $DTC_4$, and/or $DTC_6$ rather than other diagnostic conditions which need higher speed, constant speed, etc., that are less likely to be met in a congested urban area.

Terrain data may include lateral and/or longitudinal slope of road, curvature diameter of road, etc. Thus, the computer 110 may be programmed to select a diagnostic condition, e.g., $DTC_1$, upon determining a route that has a road section with the curvature diameter exceeding a predetermined threshold. In one example, a road section with the curvature diameter greater than 5000 meters may be referred to as a straight road section.

Operating patterns associated with some diagnostic conditions may be discomforting for a vehicle 100 occupant, e.g., exceeding an acceleration threshold such as 1.5 m/s², actuating engine brakes, etc. The computer 110 may be programmed to adjust the specified operating pattern upon determining that the vehicle is operating without a vehicle occupant. For example, upon determining that the vehicle 100 is operated without an occupant, e.g., based on data received from an occupancy sensor 130, interior camera sensor 130, etc., the computer 110 may be programmed to adjust the operating pattern to fulfill a diagnostic condition that may be discomforting for a vehicle 100 occupant.

Process

Figure 3A:
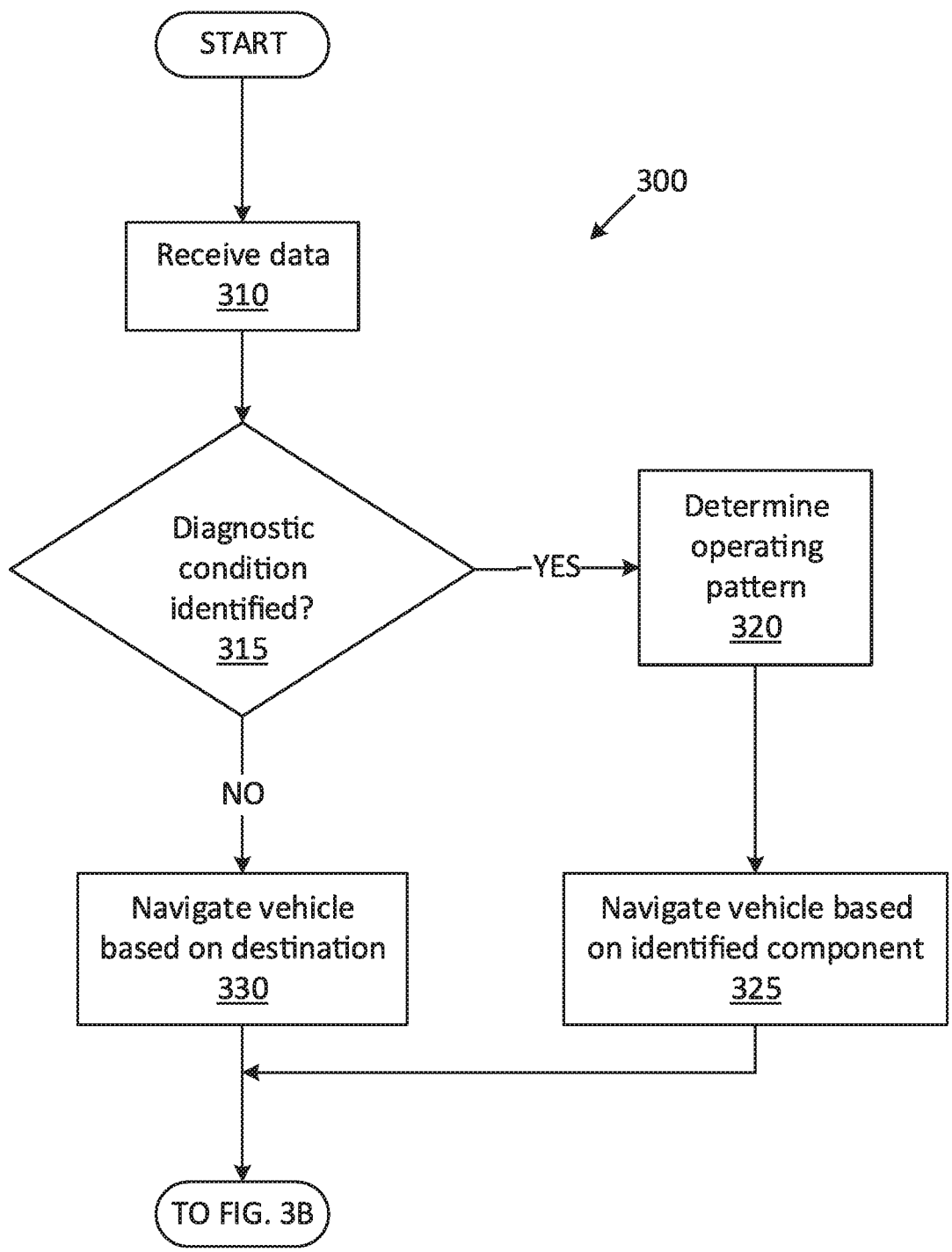
FIGS. 3A-3B are a flowchart of an exemplary process for navigating a vehicle while performing a diagnostic operation.
Figure 3B:
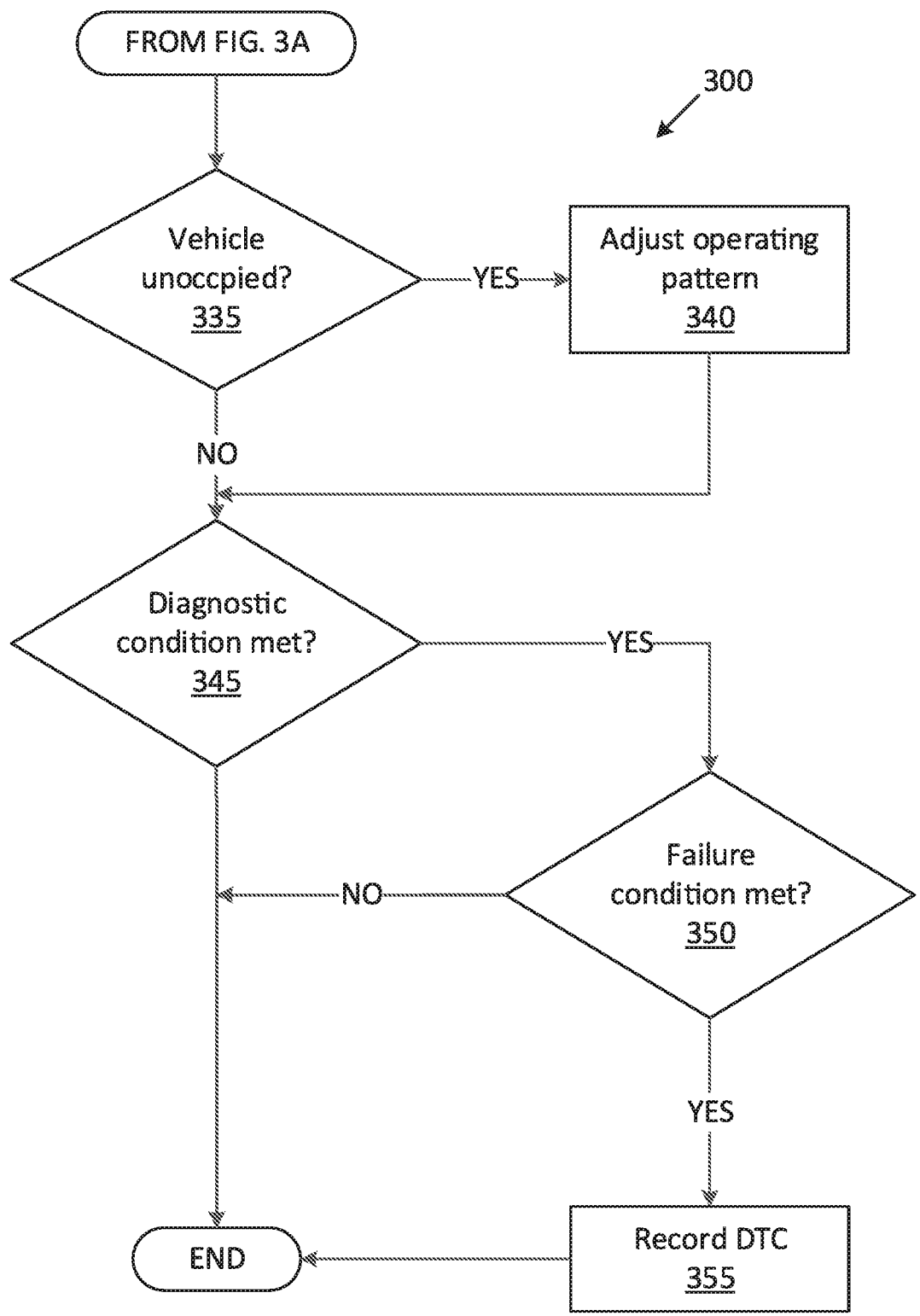

FIGS. 3A-3B are a flowchart of an exemplary process 300 for navigating a vehicle while performing a diagnostic operation. For example, the vehicle 100 computer 110 may be programmed to execute blocks of the process 300.

With reference to FIG. 3A, the process 300 begins in a block 310, in which the computer 110 receives data including a vehicle 100 current location, a destination, map data, diagnostic condition(s), and/or vehicle 100 occupancy data. The computer 110 may be programmed to receive the current location from a vehicle 100 GPS sensor, the destination from the HMI 140 and/or a remote computer, the occupancy data from a vehicle 100 occupancy sensor, the diagnostic conditions from a computer 110 memory, etc.

Next, in a decision block 315, the computer 110 determines whether a diagnostic condition can be identified for performing a diagnostic operation on at least one vehicle 100 component such as propulsion, steering, and/or braking. The computer 110 may be programmed to select a diagnostic condition from multiple diagnostic conditions. If the computer 110 identifies a diagnostic condition for a diagnostic operation on a vehicle 100 component that can be met, then the process 300 proceeds to a block 320; otherwise the process 300 proceeds to a block 330.

In the block 320, the computer 110 determines the operating pattern based on the identified diagnostic condition and the vehicle 100 component.

Next, in a block 325, the computer 110 navigates the vehicle 100 based on the determined operating pattern. For example, the computer 110 may be programmed to navigate the vehicle 100, in an autonomous mode, to the destination based on a route that is included in the operating pattern. In another example, e.g., the computer 110 may be programmed to navigate the vehicle 100 in a semi-autonomous mode, e.g., controlling a steering component of the vehicle 100 to fulfill the diagnostic condition of $DTC_1$.

In the block 330, the computer 110 navigates the vehicle 100 to destination based on the received destination and map data. For example, the computer 110 may be programmed to determine a route, using known navigation techniques, and to actuate vehicle 100 actuators 120 to traverse the route to the destination. Additionally or alternatively, a human user may control vehicle 100 operation including steering, propulsion, and/or braking.

Next, and now referring to FIG. 3B, in a decision block 335, the computer 110 determines whether the vehicle 100 has any occupant based on data received from, e.g., an occupancy sensor 130, an interior camera sensor 130, etc. If the computer 110 determines that the vehicle 100 is unoccupied, then the process 300 proceeds to a block 340; otherwise the process 300 proceeds to a decision block 345.

In the block 340, the computer 110 adjusts the vehicle 100 operating pattern. For example, the computer 110 may be programmed to adjust the operating pattern to meet a diagnostic condition that may be discomforting for a vehicle 100 occupant. In other words, a diagnostic condition that may have been unfulfillable, may be fulfillable upon adjusting the operating pattern, e.g., actuating engine brakes, strong braking actuation, etc.

In the decision block 345, the computer 110 determines whether the diagnostic condition is met. If the computer 110 determines that the diagnostic condition is met, then the process 300 proceeds to a decision block 350; otherwise the process 300 ends, or alternatively returns to the block 310, although not shown in FIG. 3B.

In the decision block 350, the computer 110 determines whether at least one fault condition is met. If the computer 110 determines that a fault condition is met, then the process 300 proceeds to a block 355; otherwise the process 300 ends, or alternatively returns to the block 310, although not shown in FIG. 3B.

In the block 355, the computer 110 records the DTC for which the diagnostic condition and the fault condition are met. The computer 110 may be programmed to set the DTC status to an active state and store (or record) the DTC status in a computer 110 memory and/or transmit the DTC status to a remote computer. Following the block 355, the process 300 ends, or alternatively returns to the block 310, although not shown in FIG. 3B.

Unless indicated explicitly to the contrary, "based on" means "based at least in part on" and/or "based entirely on."

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
   based on a destination of a vehicle, identify,
   (1) from a plurality of possible vehicle diagnostic conditions, and based on the vehicle destination as well as at least one of terrain data, vehicle occupancy data, and traffic data, a diagnostic condition to be met before a diagnostic operation is to be performed, and
   (2) a specified operating pattern of a component of the vehicle, the component including at least one of vehicle propulsion, braking, and steering, the specified operating pattern including one or more physical parameters of operation of the component of the vehicle; and perform a diagnostic operation upon meeting the diagnostic condition, wherein the diagnostic operation includes operating the vehicle based on the vehicle component and the operating pattern and then verifying whether a fault condition was met based on operating the vehicle.

2. The system of claim 1, wherein the one or more physical parameters include a maximum acceleration and a minimum acceleration.

3. The system of claim 2, wherein the instructions further include instructions to operate the vehicle at an acceleration greater than the minimum acceleration and less than the maximum acceleration.

4. The system of claim 1, wherein one or more physical parameters include a maximum yaw rate and a minimum yaw rate.

5. The system of claim 1, wherein one or more physical parameters include a maximum speed and a minimum speed associated with a road type.

6. The system of claim 1, wherein the instructions further include instructions to select the vehicle diagnostic condition from a plurality of possible vehicle diagnostic conditions based on an assigned priority of each of the possible diagnostic conditions.

7. The system of claim 1, wherein the vehicle diagnostic condition includes one or more of a substantially constant vehicle engine speed for a predetermined time, a deceleration caused by a fuel shut off, exceeding a predetermined vehicle speed, and applying a predetermined brake pressure.

8. The system of claim 1, wherein the instructions include further instructions to adjust the specified operating pattern upon determining that the vehicle is operating without a vehicle occupant.

9. A method, comprising:
based on a destination of a vehicle, identifying,
(1) from a plurality of possible vehicle diagnostic conditions, and based on the vehicle destination as well as at least one of terrain data, vehicle occupancy data, and traffic data, a diagnostic condition to be met before a diagnostic operation is to be performed, and
(2) a specified operating pattern of a component of the vehicle, the component including at least one of vehicle propulsion, braking, and steering, the specified operating pattern including one or more physical parameters of operation of the component of the vehicle; and perform a diagnostic operation upon meeting the diagnostic condition, wherein the diagnostic operation includes operating the vehicle based on the vehicle component and the operating pattern and then verifying whether a fault condition was met based on operating the vehicle.

10. The method of claim 9, wherein one or more physical parameters include a maximum acceleration and a minimum acceleration.

11. The method of claim 10, further comprising operating the vehicle at an acceleration greater than the minimum acceleration and less than the maximum acceleration.

12. The method of claim 9, further comprising selecting the vehicle diagnostic condition from a plurality of possible vehicle diagnostic conditions based on an assigned priority of each of the possible diagnostic conditions.

13. The method of claim 9, wherein the vehicle diagnostic condition includes one or more of a substantially constant vehicle engine speed for a predetermined time, a deceleration caused by a fuel shut off, exceeding a predetermined vehicle speed, and applying a predetermined brake pressure.

* * * * *